United States Patent
Chi

[19]

[11] Patent Number: 5,960,452
[45] Date of Patent: Sep. 28, 1999

[54] OPTIMIZING ACCESS TO MULTIPLEXED DATA STREAMS ON A COMPUTER SYSTEM WITH LIMITED MEMORY

[75] Inventor: Darren Chi, Alhambra, Calif.

[73] Assignee: Symantec Corporation, Cupertino, Calif.

[21] Appl. No.: 08/772,434

[22] Filed: Dec. 23, 1996

[51] Int. Cl.[6] .................................................. G06F 12/00
[52] U.S. Cl. .......................................... 711/117; 707/100
[58] Field of Search .......................... 395/182.06; 707/1, 707/100; 711/101, 171, 117

[56] References Cited

U.S. PATENT DOCUMENTS

| | | | |
|---|---|---|---|
| 5,247,658 | 9/1993 | Barrett et al. | 707/1 |
| 5,414,826 | 5/1995 | Garcia | 711/101 |
| 5,422,762 | 6/1995 | Jerbic | 360/48 |
| 5,638,506 | 6/1997 | Peterson et al. | 395/182.06 |
| 5,652,865 | 7/1997 | Rawlings, III | 711/171 |

FOREIGN PATENT DOCUMENTS 0 510 834 A3  10/1992  European Pat. Off. ...... G06F 15/419

*Primary Examiner*—Tod R. Swann
*Assistant Examiner*—David Laugjahr
*Attorney, Agent, or Firm*—Fenwick & West LLP

[57] ABSTRACT

A system and method accelerate access time to multiplexed data streams. Data streams are stored in a storage medium (120), and a link allocation table (LAT) (160), which is stored in the storage medium (120), maps blocks of a data stream to sectors of the storage medium (120). The LAT (160) is organized as a set of linked lists, and each data stream is associated with a different linked list in the LAT (160). Each link in a linked list includes the sector location for a different block of the data steam. Traversing the links of the linked list gives the sector location of each subsequent block of data. Each data stream is also associated with a cache memory (140). For each link of a linked list that is traversed, a cache interface (150) writes into an appropriate cache (140) the sector location information stored in the link. When the sector location of a block in a data stream is desired, the cache interface (150) consults the appropriate cache (140) associated with the data stream to determine whether the sector location of the block has been cached. If the information has been cached, the information is retrieved from the cache (140), and the LAT (160) is not used. If the sector location has not been cached, the cache interface (150) determines the last sector location to have been cached, and the appropriated linked list in the LAT (160) is traversed from the entry corresponding to the last sector location cached.

11 Claims, 12 Drawing Sheets

| 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
| 1 | 2 | 3 | -1 | -1 | | 7 | 9 | | 10 | 11 | 14 | | | 15 | 16 | 17 | 4 |

*PRIOR ART*

OPTIMIZING ACCESS TO MULTIPLEXED DATA STREAMS ON A COMPUTER SYSTEM WITH LIMITED MEMORY

TECHNICAL FIELD

This invention relates generally to electronic data storage and retrieval, and more specifically to a system and method for accessing a multiplexed data stream stored in a storage medium.

BACKGROUND ART

Many data streams (e.g. files) are often stored on a single storage medium, such as a hard disk. The storage medium is divided into sectors, and each data stream is assigned enough sectors to hold all of its data. Each sector can be assigned to only one data stream. A data stream can be viewed as being divided up into a consecutive set of blocks, where each block is the size of a sector. Each block of a data stream is stored in a different sector of the storage medium.

All blocks of a data stream are not necessarily located in successive sectors, but, rather, may be interleaved with blocks of several other data streams in the storage medium. Data streams that have blocks or groups of blocks interleaved with blocks of other data streams are called multiplexed data streams.

A known method for managing the storage and retrieval of multiplexed data streams is by means of a data structure known as a linked allocation table (LAT). A LAT is used to locate a selected part of a data stream in the storage medium. It is a table with s entries, where s is the number of sectors in the storage medium. Thus, a storage medium with twice as many sectors as another would have a LAT twice the size. Examples of LATs include the File Allocation Table (FAT) of Microsoft Corporation's DOS and the Block Allocation Table (BAT) of Microsoft Corporation's OLE Storage Format.

A LAT maps blocks of a data stream to sectors of a storage medium. If the sector containing the nth block of a data stream is known, the LAT can be used to find the sector containing the (n+1)th block. It is organized as a set of linked lists, where each linked list is associated with exactly one data stream. Following the links of a linked list in order gives the sector location of each subsequent block of the data stream. For example, given a sector number a (i.e., a sector identified by the number a) containing the first block of a data stream, entry a of the LAT gives the sector number, call it b, containing the second block of the data stream. Entry b of the LAT then gives the sector number containing the third block of the data stream. The linked list is followed in this manner until the location of the desired block of the data stream is determined.

FIG. 1 illustrates a table representing a conventional LAT for a 18 sector storage medium multiplexing two data streams. The labels above the table number the entries of the LAT. Each entry corresponds with a sector of the storage medium. If a sector belongs to a given data stream, then the LAT entry corresponding to that sector specifies the sector number of the next block in the data stream.

In the table illustrated in FIG. 1, the first block of the first data stream begins at sector zero. The location of the first block of a data stream is stored in a "directory" that usually resides on a reserved set of sectors or as a data stream on the storage medium. When the storage medium is formatted before use, a sufficient number of sectors can be reserved for storing the directory. If a data stream needs to be accessed, the location of the first block is found in the directory.

Referring again to FIG. 1, looking at entry 0, which corresponds to sector 0, in the LAT tells us that the next block of the data stream is located at sector 1. Entry 1 of the LAT indicates that the third block of the data stream is located at sector 2, and entry 2 shows that the fourth block is at sector 3. Finally, entry 3 has the value -1, indicating that sector 3 contains the last block of the data stream.

The first block of the second data stream begins at sector 6 (this information is obtained from the directory discussed above). Following the links in the manner described above shows that the subsequent blocks of the data stream are located at sectors 7, 9, 10, 11, 14, 15, 16, 17 and 4. The second data stream is an example of a data stream that does not have blocks located in contiguous sectors of the storage medium.

Using the above described methods in order to locate a particular block of a data stream requires that the links be followed until the link for the desired block is reached. The LAT itself is stored in sectors of the storage medium, and, in order to follow the links, the LAT has to be read into memory.

For a storage medium with many sectors, the LAT is large, and storing the whole LAT in memory may not be possible. Thus, portions of the LAT are read into memory as they are needed. For a large data stream or for one whose parts are spread across a large portion of the storage medium, many reads may be required just to bring the necessary portions of the LAT into memory. These reads can be time consuming and can take up a large portion of the total time required to access portions of a data stream. Additionally, the reads use up a lot of valuable memory.

Therefore, it is desirable to have a faster and more memory efficient method for determining the location of a sector containing a particular block of a data stream than is currently known.

DISCLOSURE OF INVENTION

The present invention is a computer system (100) and method for optimizing access to multiplexed data streams. A computer system (100) according to the present invention includes a storage medium (120) divided into sectors, a LAT (160) stored in the storage medium (120), a system memory (170) and several other memory devices (140).

Data streams are stored in the storage medium (120). As discussed above, each data stream is divided into blocks, and each block is located in a different sector of the storage medium (120). The LAT (160) maps blocks of a data stream to sectors of the storage medium (120).

The present invention associates with each accessed data stream a memory device (140). In one embodiment, the memory device (140) is a cache.

Each data stream is also associated with a linked list in the LAT (160), and traversing the links of the list in order gives the sector location of each subsequent block of data. For each link that is traversed, the present invention writes into an appropriate cache (140) the sector location information stored in the link. When the sector location of a block in a data stream is desired, the cache (140) of the data stream is consulted to determine whether the sector location of the block has been cached. If the information has been cached, the information is retrieved from the cache (140), and the LAT (160) is not used. If the sector location has not been cached, the system (100) determines the last sector location to have been cached, and traverses the appropriated linked list in the LAT (160) from the entry corresponding to the last sector location cached.

The present invention significantly speeds up the time required to access a block of a data stream because it reduces the number of times the LAT (160) must be read into the system memory (170). If a link indicating the sector location of a desired block has been traversed, the sector location of the desired block will be in a cache (140), and the LAT (160) need not be read into the system memory (170) at all. If the link indicating the sector location of the desired block has not been traversed, only those parts of the LAT (160) corresponding to untraversed links need be read into the system memory (170). Moreover, each link of a link list is traversed only once while the system is operating because, once a link is traversed, the information in the link is cached.

Additionally, the present invention caches links of the LAT (160) in a compressed form. Because of this and because the present invention reduces the amount of times the LAT (160) is read into the system memory (170), the present invention requires little memory and provides fast seek times even under the strictest memory constraints.

The cache (140) stores sector location information in packets and subpackets. For blocks that are in consecutive order and that are located in consecutive sectors, sector location information is stored in the same subpacket. A subpacket represents a group of consecutive blocks in consecutive sectors. A packet represents a set of consecutive groups of blocks. When each group in a set of consecutive groups is separated by a constant number of sectors from the next group, the set of consecutive groups is stored in a type of packet referred to as a separation packet. The header of a separation packet stores the number of sectors separating each group and the sector location of the first block in the packet. Since the number of sectors separating each group is constant, the subpackets need only specify the number of blocks in each group, not the sector location of each block. This reduces the amount of memory needed to store sector location information.

A packet referred to as an absolute packet is used to store groups of blocks where the groups are separated from each other by a greater number of sectors than is permitted for separation packets. Moreover, the separation between groups in absolute packets does not have to be constant. Each subpacket in an absolute packet specifies the number of blocks in each group and the sector location of the first block in the group. As is the case with separation packets, the method of storing the number of blocks in each group reduces the amount of memory needed to store sector location information.

Therefore, the present invention provides a method and system for reducing the amount of memory and time needed to access a data stream.

BRIEF DESCRIPTION OF THE DRAWINGS

These and other more detailed and specific objects and features of the present invention are more fully disclosed in the following specification, reference being had to the accompanying drawings, in which:

FIG. 1 illustrates a known Link Allocation Table.

DETAILED DESCRIPTION OF THE PREFERRED EMBODIMENTS

Figure 2:
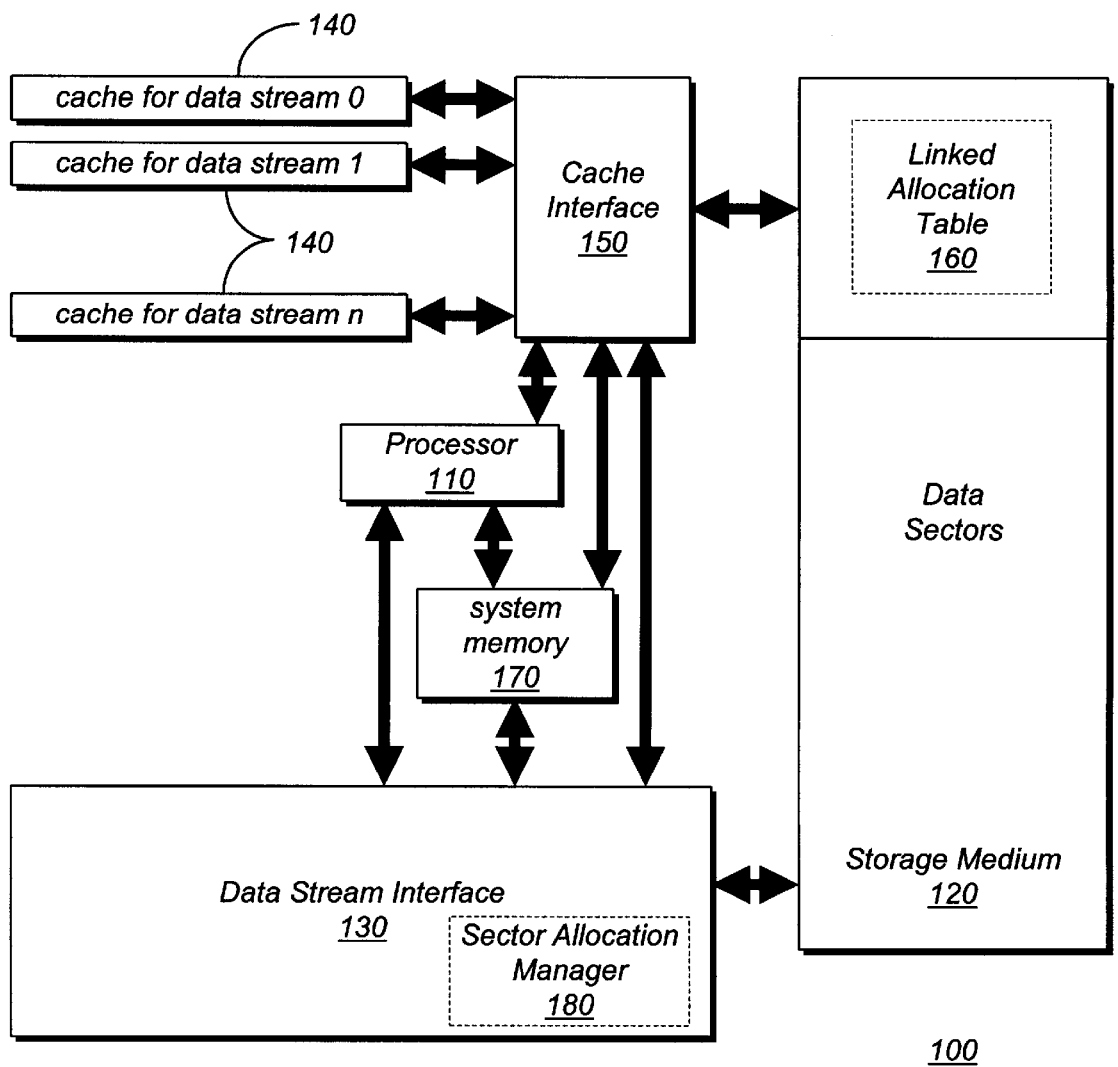
FIG. 2 illustrates a computer system according to the present invention.

FIG. 2 illustrates a computer system 100 according to the present invention. The system 100 includes a processor 110, a conventional storage medium 120, a data stream interface 130, conventional cache memories 140, a system memory 170 and a cache interface 150.

The storage medium 120 is divided into sectors, and a LAT 160 (e.g. the kind of LAT described above) and data streams are stored in the sectors. Each data stream is divided into blocks, and each block is located in a different sector of the storage medium 120. In response to a command from the processor 110, which can be any number of known processors (e.g., the Pentium Processor manufactured by Intel Corporation), the date stream interface 130 retrieves data streams from and stores data streams in the storage medium 120. The data stream interface 130 is a conventional interface with storage mediums.

As discussed above, a LAT 160 maps blocks of a data stream to sectors of the storage medium 120. The LAT 160 is organized as a set of linked lists. Each data stream is associated with a different linked list in the LAT 160, and each link in a list includes the sector location for a different block of the data stream. Traversing the links of the linked list gives the sector location of each subsequent block of data.

Each data stream is also associated with a different one of the cache memories 140. For each link of a linked list that is traversed, an indication of the sector location information stored in the link is written in the appropriate cache memory 140 (i.e. the cache memory associated with the same data stream as the linked list.) The cache interface 150 stores information in and retrieves information from the cache 140 in response to a command from the processor. When the sector location of a block in a data stream is desired, the cache interface 150 checks the cache memory 140 (hereinafter "cache") associated with the data stream to determine whether the sector location of the block has been cached. If the information has been cached, the cache interface 150 retrieves the information from the cache 140, and the LAT 160 is not used. The cache interface 150 sends the retrieved information to the data stream interface 130 so that the desired block can be read. If the sector location has not been cached, the cache interface 150 determines the last sector location to have been cached, and traverses the appropriate linked list in the LAT 160 from the entry corresponding to the last sector location cached. If the LAT 160 is to be traversed, the cache interface 150 obtains the sector location of the LAT from the data stream interface 130, and retrieves the appropriate sections of the LAT 160. The cache interface 150 then writes these sections into the system memory 170, so that they can be searched. The system memory 170 can be any number of conventional memories.

The way sector location information is stored in the caches 140 results from the way blocks of data streams are assigned sector locations. Although consecutive blocks of a data stream are not necessarily stored on consecutive sectors of the storage medium, there usually will be at least one group of consecutive blocks stored on consecutive sectors. This is due to the method by which a sector allocation manager 180 allocates sectors of the storage medium 120 to growing or shrinking data streams. The sector allocation manager 180 is a component of the data stream interface 130. An example of a sector allocation manager 180 is the DOS operating system or Microsoft Corporation's OLE storage manager. A sector not allocated to a data stream may be free for future allocation, and each entry of the LAT 160 indicates whether the sector corresponding to that entry is free for allocation. To find a free sector, the sector allocation manager 180 searches each entry of the LAT 160 in consecutive order and looks for an indication of a free sector. Because the entries are searched consecutively, successive blocks of a data stream tend to be allocated to successive sectors.

Usually not all blocks of a data stream are located on consecutive sectors, however. One reason for this is that data streams can shrink and grow in size. As a data stream shrinks, sectors are deallocated from the data stream, and the deallocated sectors become sectors free for future allocation to another data stream. Since the sector allocation manager 180 consecutively searches the LAT 160 for free sectors, a growing data stream will be allocated the first free sector found regardless of whether that sector is adjacent to other sectors allocated to the data stream. Consequently, all blocks of a growing data stream will not likely be on consecutive sectors.

Another reason why blocks of a data stream are not necessarily on consecutive sectors is because the storage medium 120 and the LAT 160 may also grow and shrink in size. In one embodiment, the storage medium 120 can change size based on the amount of storage required for the data streams. As the storage medium 120 changes size, the LAT 160 also changes size because the LAT 160 has substantially as many entries as sectors in the storage medium 120 and because it wastes storage space to have a LAT 160 that has more entries than the number of sectors in the storage medium 120. Thus, if the storage medium 120 shrinks, the LAT 160 will shrink and sectors allocated to the LAT 160 will be free for future allocation to data streams. If the storage medium 120 grows, the LAT 160 will grow and additional sectors will be allocated to the LAT 160. Consequently, consecutive blocks in a data stream may be separated in the storage medium 120 by sectors allocated to the LAT 160.

The organization of the cache memories 140 reflects the fact that, while usually not all blocks of a data stream are located in consecutive sectors, there usually are groups of blocks in a data stream that are located in consecutive sectors. An example, using the LAT in FIG. 1, will be used to illustrate the organization of the cache memories 140.

As already described in the Background Art section, the second data stream of the LAT in FIG. 1 has ten blocks, which are stored as sectors 6, 7, 9, 10, 11, 14, 15, 16, 17 and 4 in the storage medium 120. Four groups of consecutive blocks stored on consecutive sectors can be identified:

| Group # | Data Stream Block Numbers | Sector Numbers On Storage Medium |
|---|---|---|
| 0 | 0, 1 | 6, 7 |
| 1 | 2, 3, 4 | 9, 10, 11 |
| 2 | 5, 6, 7, 8 | 14, 15, 16, 17 |
| 3 | 9 | 4 |

Although group #3 has only one block, this group is treated as having consecutive blocks stored on consecutive sectors.

Each cache 140 is organized as an array of packets, each packet having at least one subpacket. A subpacket represents a group of consecutive blocks located in consecutive sectors of the storage medium 120. Therefore, each of groups 0–3 in the above example is represented by a different subpacket. A subpacket representing a group includes an indication of the sector location of each block in the group.

The subpackets are created in the cache 140 in the same order as blocks are ordered in the data stream corresponding to the cache 140. Therefore, the subpacket representing group 1 will appear in the cache 140 before the subpacket representing group 2, which will appear in the cache 140 before the subpacket representing group 3, and so on. To find a particular sector location that has been cached, the subpackets are traversed and searched in order.

A set of subpackets comprise a packet, which represents a set of groups of consecutive blocks. In one embodiment, there are two types of packets in the caches 140: separation packets and absolute packets. When each group in a set of consecutive groups is separated by a constant number of sectors from the next group, the set of consecutive groups are stored in a separation packet. For instance, group #0, which ends at sector 7 of the storage medium 120, and group #1, which begins at sector 9 of the storage medium 120, are separated by one sector, namely sector 8. Therefore, the subpackets representing group #0 and group #1 may be part of a separation packet referred to as a "separation-by-1" packet because the groups are separated by one sector.

In one embodiment, there is a maximum number of sectors by which groups can be separated in order to form a separation packet. For instance, assume that in this example the maximum number is one. Groups 1 and 2, which are separated by two sectors, can not then both be part of the same separation packet. When the separation between groups is greater than a maximum number allowed, the groups are stored in an absolute packet.

A separation packet may have limits on the number of sectors by which groups can be separated because the header of the separation packet must specify in one of its fields the separation between each group represented by the packet. An absolute packet does not need to specify a separation in the header, and, thus, an absolute packet does not have limitations on the number of sectors by which groups can be separated. There are two implementation choices as how to specify the separation in a separation packet. One way is to set the field having the separation information to a constant size. If the field size is constant, there is a maximum number of bits which can be used to store the separation information. For instance, if the maximum number of bits is, for example, eight, the maximum separation that can be stored is 255.

In another embodiment, there is a maximum number of blocks that a subpacket in a separation packet can hold. For instance, assume that in the example of the second data stream in FIG. 1 the maximum number is three. Group 2 which represents four blocks cannot then be part of a separation packet. Consequently, the group is stored in an absolute packet. When the number of blocks representing a subpacket is greater than the maximum allowed, the separation is stored in an absolute packet. As is the case with sector separation, the reason there may be limits on the number of blocks a separation subpacket can hold is that the field indicating the block number may be of a fixed size.

Another way to specify separation and block count is to have the separation and block count fields be dynamically expandable. If the fields are dynamically expandable, then there is no need for an absolute packet because no limits exist on the number of sectors by which groups can be separated and on the number of blocks in a subpacket. However, using dynamically expandable fields does not result in as efficient use of memory as using fixed size fields because more memory is required to encode the length of the dynamically expandable field. Absolute packets provide efficiency in cases where there are large groups of consecutive sectors and where the separation distances are large or irregular.

The following illustrates the organization of the packets and subpackets in a cache memory:

```
Cache Header:
    Number of links cached
    Number of packets
    Location of last packet
Packet 0:
    Packet Header
    Subpacket 0
    Subpacket 1
    . . .
    Subpacket . . .
Packet 1:
    Packet Header
    Subpacket 0
    Subpacket 1
    . . .
    Subpacket . . .
. . .
Packet . . .:
    Packet Header
    Subpacket 0
    Subpacket 1
    . . .
    Subpacket . . .
```

The header of the cache indicates the number of packets in the cache. Although not necessary for searching, such information may facilitate search of the cache. The header of a cache 140 also indicates the number of sector locations cached in that cache 140. Such information allows the cache interface 150 to quickly determine whether a particular sector location has been cached. The cache header also indicates the location of the last packet, which allows the last sector location cached to be easily found since information relating to the last sector location cached is stored in the last packet. The cache interface 150 finds the identity of the last sector location cached in response to a search for a sector location that has not been cached in a cache memory. As discussed above, the last sector location cached is found so that the appropriate linked list in the LAT 160 can be searched from a point corresponding to the last cached sector location.

A packet header (as opposed to a cache header) indicates the type of the packet (i.e. separation v. absolute) that it is. It also indicates the number of subpackets within the packet so that the packet can be easily searched and so that the last subpacket can be easily found.

The following shows the contents of a cache memory 140 associated with the second data stream in FIG. 1 when all the sector locations for the second data stream have been cached:

```
Cache Header:
    Number of links cached              10
    Number of packets                    2
    Location of last packet       Packet 1
Packet 0:
    Packet Header
        Packet type              SEP_BY_1
        Number of subpackets            2
        Starting sector                 6
    Subpacket 0
        Block count                     2
    Subpacket 1
        Block count                     3
Packet 1:
    Packet Header
        Packet type                   ABS
        Number of subpackets            2
```

-continued

```
    Subpacket 0
        Starting sector                14
        Block count                     4
    Subpacket 1
        Starting sector                 4
        Block count                     1
```

Since all the sector locations for the cache 140 have been cached and since there are ten blocks, the cache header indicates that ten sector locations have been cached. The cache header also indicates that there are two packets in the header and that the last packet is Packet 1.

The header of packet 0 indicates that the packet is a separation-by-1 packet, meaning that one sector separates groups of consecutive blocks represented in packet 0 (stated another way, separation-by-1 means that the last block in a subpacket is separated by one sector from the first block of the following subpacket). The header of packet 0 also shows that the first block represented in packet 0 starts at sector 6. Moreover, the packet header shows that there are two subpackets in the packet, which is useful information for quickly finding the last subpacket in the packet.

Subpacket 0 of packet 0 has a block count of 2. This means that subpacket 0 represents two blocks of the data stream, namely the first two blocks (blocks 0 and 1), since this subpacket is the first subpacket in the cache 140. There is no need to store sector location information for blocks 0 and 1 because the packet header indicates that the starting sector of the first block represented by the packet is sector 6. Therefore, block 0, the first block represented by the packet, starts at sector 6. Since subpackets represent consecutive blocks located in consecutive sectors, we know that block 1 is located in an adjacent, higher sector to block 0, namely sector 7.

Subpacket 1 has a block count of 3, indicating that it represents three blocks of the data stream. Blocks are represented in order, and therefore, subpacket 1 represents blocks 2, 3 and 4. Sector location information does not have to be stored for these blocks because such information can be obtained from the fact that subpacket 1 is part of a separation-by-1 packet and from the fact that we know the location of the last block in subpacket 0. Specifically, since the last block (block 1) of subpacket 0 is located at sector 7 and is separated by one sector from the first block (block 2) of subpacket 1, we know block 2 is located at sector 9. Since blocks 3 and 4 are represented by the same subpacket as block 2, they are in adjacent, higher sectors to block 2. Therefore, we know block 3 is in sector 10 and block 4 is in sector 11.

The header of packet 1 indicates that the packet is an absolute packet and that the packet includes two subpackets. Subpacket 0 stores a block count of 4, indicating that the subpacket represents four blocks of the data stream (blocks 5, 6, 7, and 8). Subpacket 0 also stores a starting sector of 14, which means that the first block in the subpacket is located at sector 14. The next block in the data stream is block 5 (packet 0 represented blocks 0–4), and, therefore block 5 is located at sector 14. Since blocks 6, 7, and 8 are represented by the same subpacket as block 5, they are in adjacent, higher sectors to block 2. Therefore, we know blocks 6, 7, and 8 are in sectors 15, 16, and 17, respectively.

Subpacket 1 has a block count of 1 and a starting sector of 4. Therefore, subpacket 1 indicates that block 9 is located at sector 4.

Subpackets of absolute packets store starting sector locations because, in absolute packets, there is no constant number of sectors separating groups, and, therefore, the sector location of blocks in a subpacket can not be determined from the sector location of blocks in previous subpackets (as can be with separation packets). Absolute subpackets generally take up more memory than separation subpackets because they store the starting sector in addition to the block count.

Figure 3:
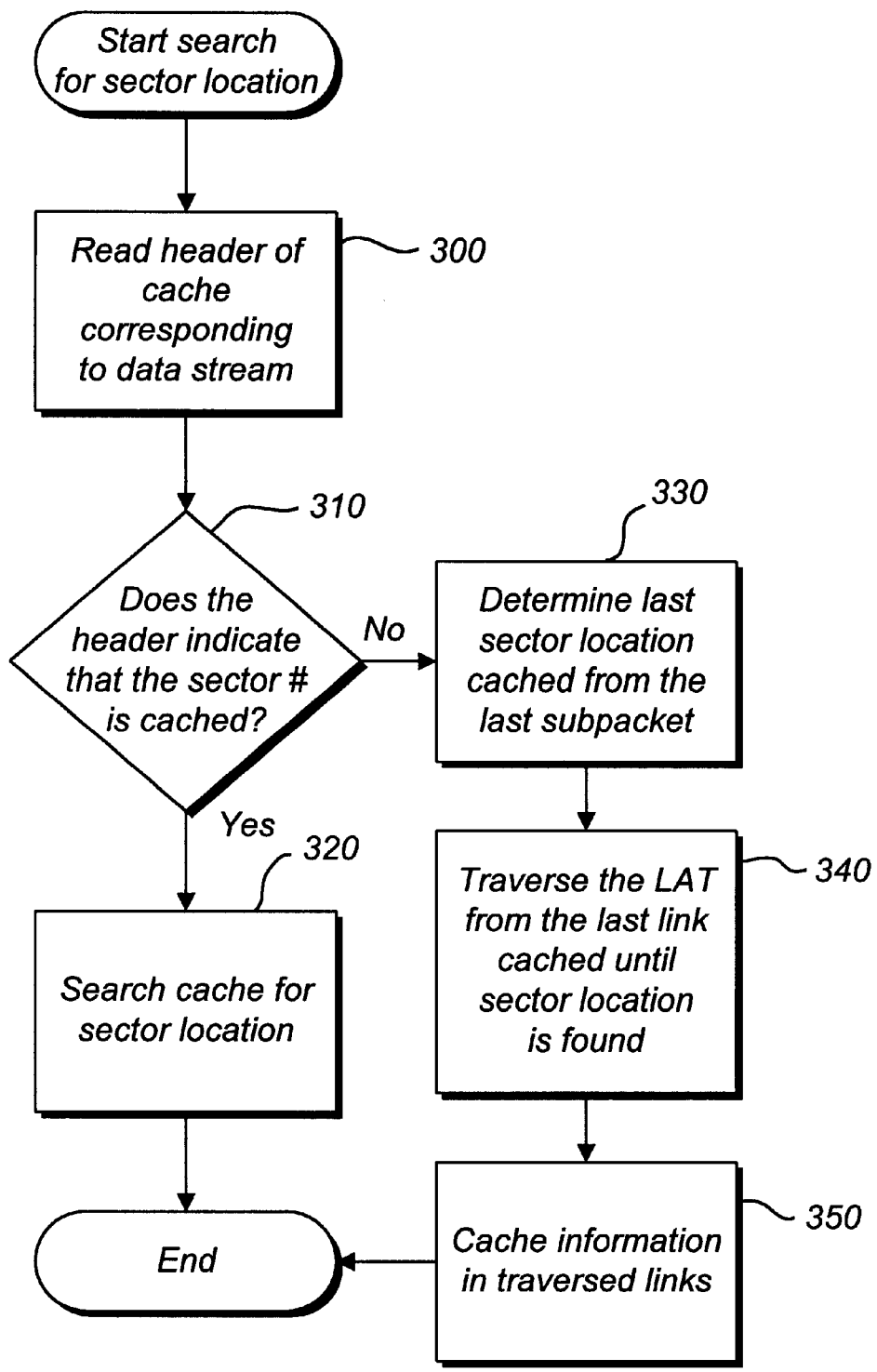
FIGS. 3–11 are flow charts illustrating a preferred embodiment of the present invention.

FIG. 3 illustrates the method the cache interface 150 uses to search for a sector location for a particular block of a data stream. In response to a search for the sector location, the cache interface 150 reads 300 the header of the cache 140 corresponding to the data stream. As discussed above, the cache header indicates the number of sector locations cached, and, from the header, the cache interface 150 determines 310 whether the sector location has been cached. For instance, if the cache interface 150 is looking for the sector location for block 5 and if only four sector locations have been cached, then the cache interface 150 knows that the sector location has not been cached for block 5 because sector locations are cached in order of the blocks.

If the header of the cache indicates that the sought sector location has been cached, the cache interface 150 searches 320 the cache 140 for the sector location. If the header of the cache indicates that the sought sector location has not been cached, then the cache interface 150 determines 330 the last sector location cached by reading the packets in the cache 140 (as illustrated in FIG. 4b). After determining 330 the last sector location cached, the cache interfaces 150 traverses 340 the appropriate linked list in the LAT 160 from the entry corresponding to the last sector location cached. For instance, referring to the second data stream in FIG. 1, if the last sector location cached is the sector location for block 2 (located at sector 9), then the linked list is traversed from entry 9 of the LAT until the desired sector location is found. For each link that is traversed, information stored in the link is written 350 into the cache 140.

Figure 4A:
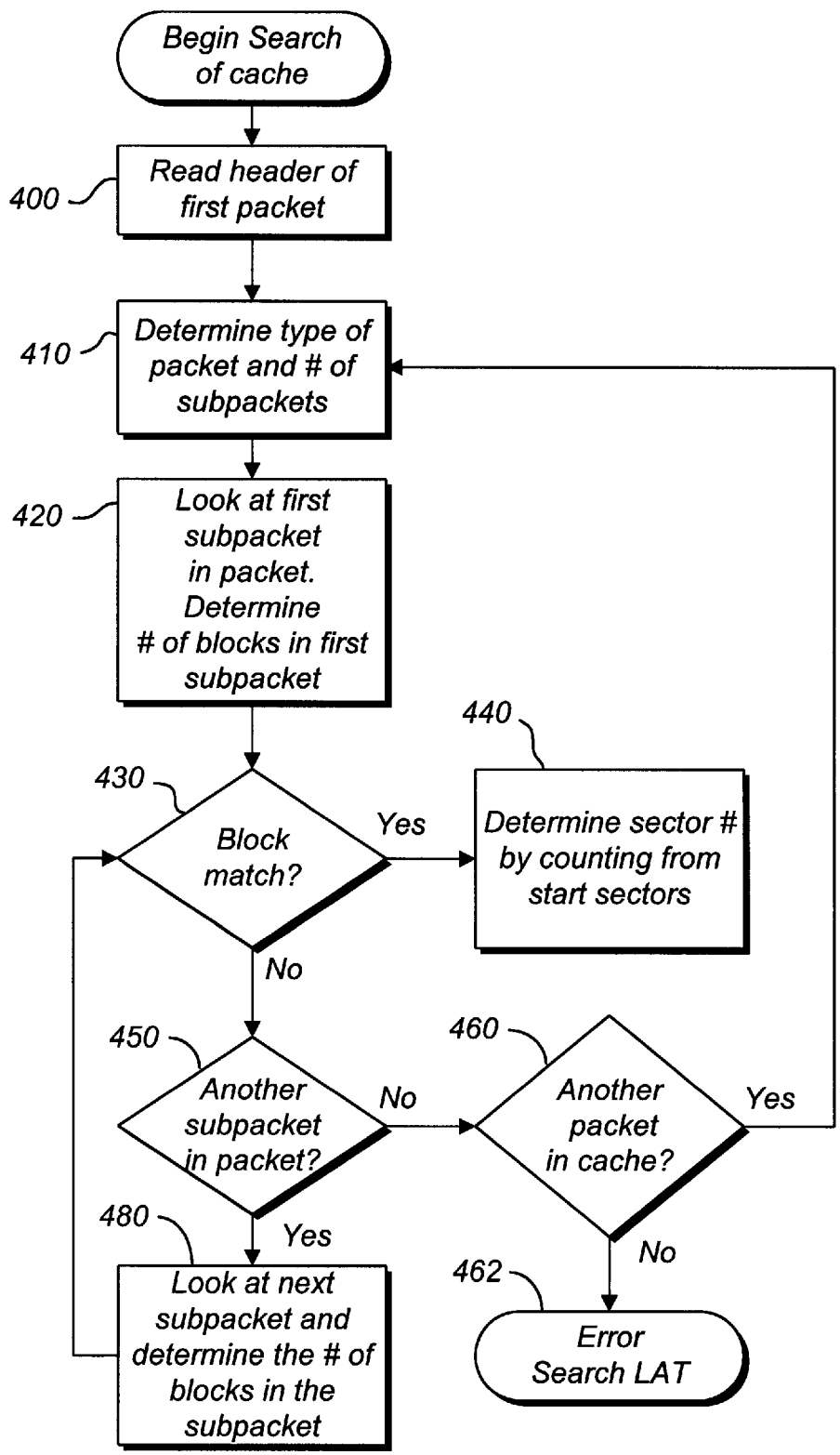
Figure 4B:
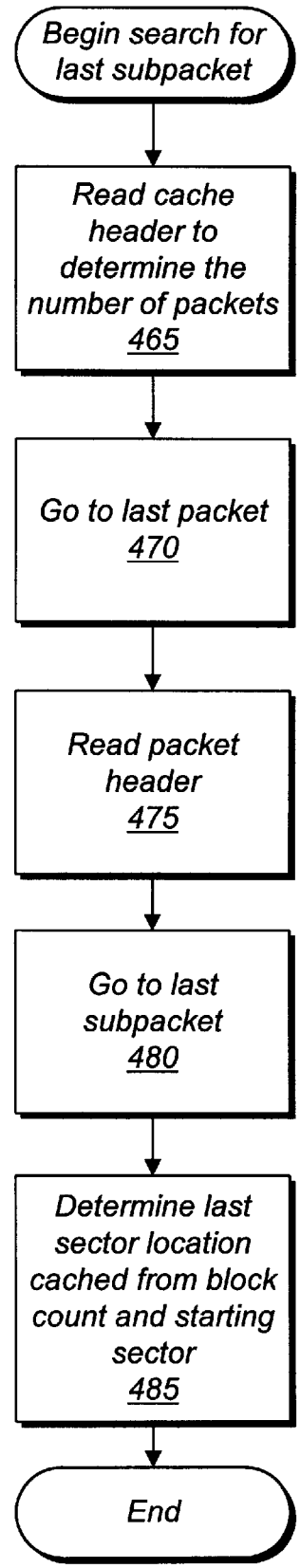

FIG. 4a illustrates the method used by the cache interface 150 to search for a sector location stored in a cache 140. The cache interface 150 reads 400 the header of the first packet in the cache 140 to determine 410 the type of packet and the number of subpackets. The cache interface 150 then looks 420 at the first subpacket of the first packet and determines 420 the number of blocks represented by the subpacket from the block count. The cache interface 150 determines 430 whether the block for which the sector location is sought ("the subject block") is represented by the first subpacket. This is done for the first subpacket by ascertaining whether the block number of the subject block is greater, equal or less than the block count. For instance, if the subject block is the fifth block and the block count is 2, then the fifth block is not represent by the first subpacket. If the block count is 5 or greater than 5, then the fifth block is represented by the first subpacket. If the subject block is represented by the first subpacket, then the sector location of the block is calculated 440 by counting from the indicated starting sector in the manner described with respect to the above example using the second data stream in FIG. 1.

In response to the block not being represented by the subpacket, the cache interface 150 determines 450 whether another subpacket exists in the packet. If another subpacket exists, the cache interface reads 480 the block count from that subpacket and repeats the process described with respect to the first subpacket from the point of determining 430 whether there is a block match. (To determine whether there is a block match for subpackets other than the first subpacket, the block count for the current subpacket is added to the cumulative block count of all previous subpackets, including those from other packets). The resulting number is then compared to the block number in the manner described above.

If there is not another subpacket in the packet, then the cache interface 150 ascertains 460 whether another packet exists in the cache 140. In response to another packet existing in the cache 140, the cache interface 150 repeats the above process from the point of determining 410 the type of packet and the number of subpackets. In response to another packet not existing in the cache 140, the cache interface 150 knows an error has occurred. The cache interface 150 then searches the cache for the last sector location information cached in accordance with the method illustrated in FIG. 4b. After finding the last sector information cached, the cache interface 150 searches 462 the LAT 160 from the entry corresponding to the last sector location cached and until the desired sector location information is found. The cache interface 150 writes an indication of the sector location information in each entry traversed.

FIG. 4b illustrates the method used by the cache interface 150 to search for the last sector location cached in the cache 140. The cache interface 150 reads 465 the cache header to determine the number of packets in the cache 140. The cache interface 150 uses this information to proceed to 470 the last packet. The cache interface 150 reads 475 the header of the last packet to determine the number of subpackets in the packet and uses this information to easily traverse 480 to the last subpacket. The cache interface then ascertains 485 the last sector location cached from the block count in the subpacket and from the starting sector indicated in either the packet header or the subpacket (depending on whether the packet is an absolute packet or a separation packet).

Figure 5:
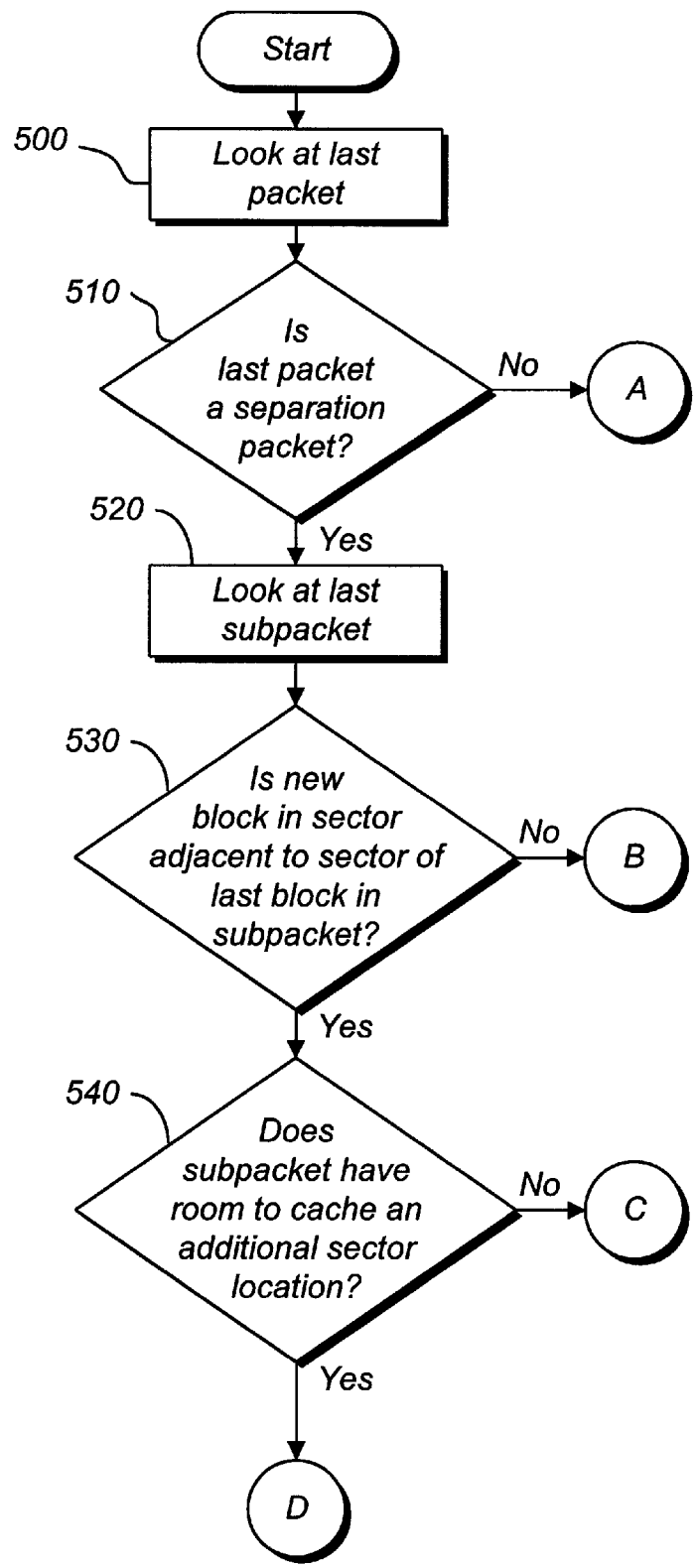
Figure 6:
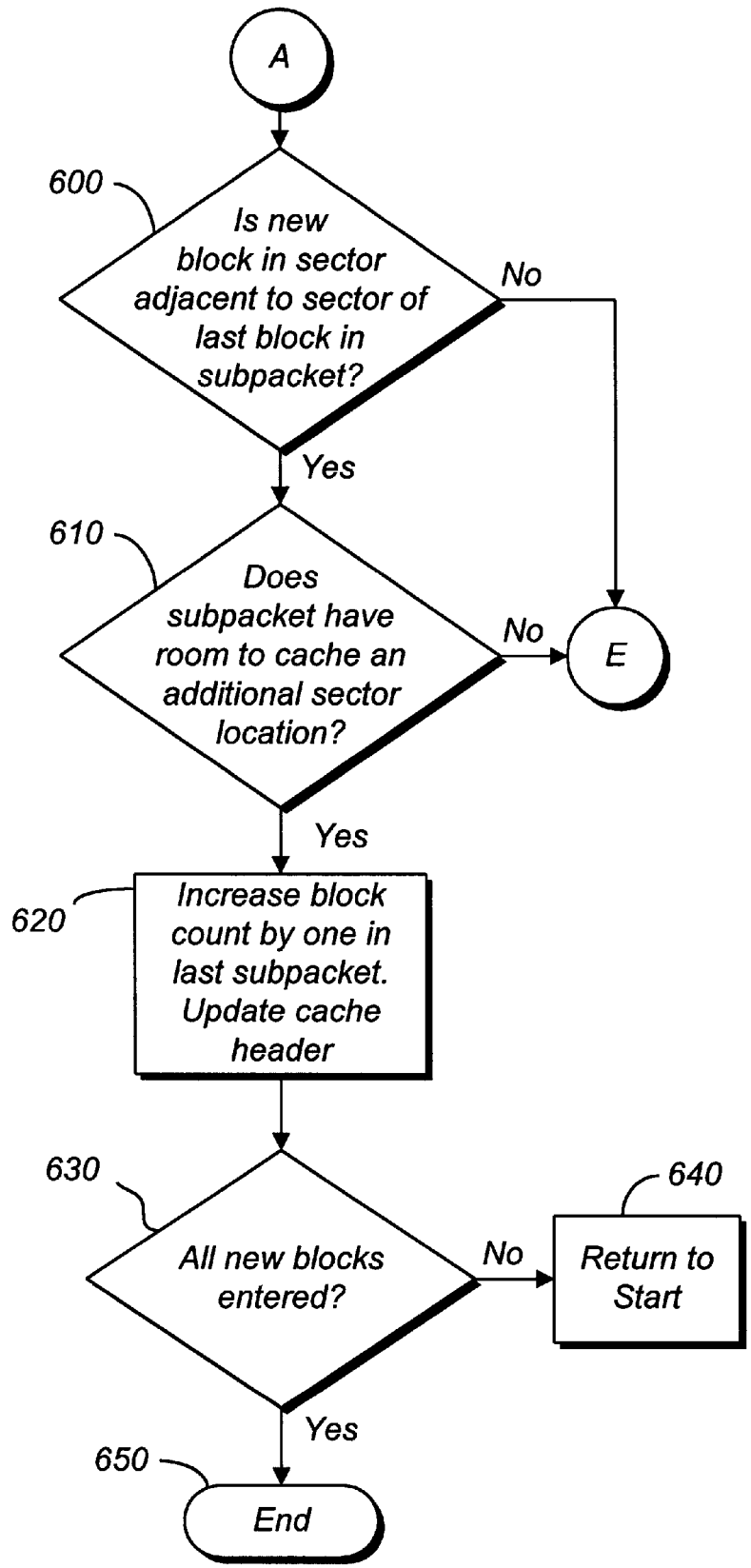
Figure 7:
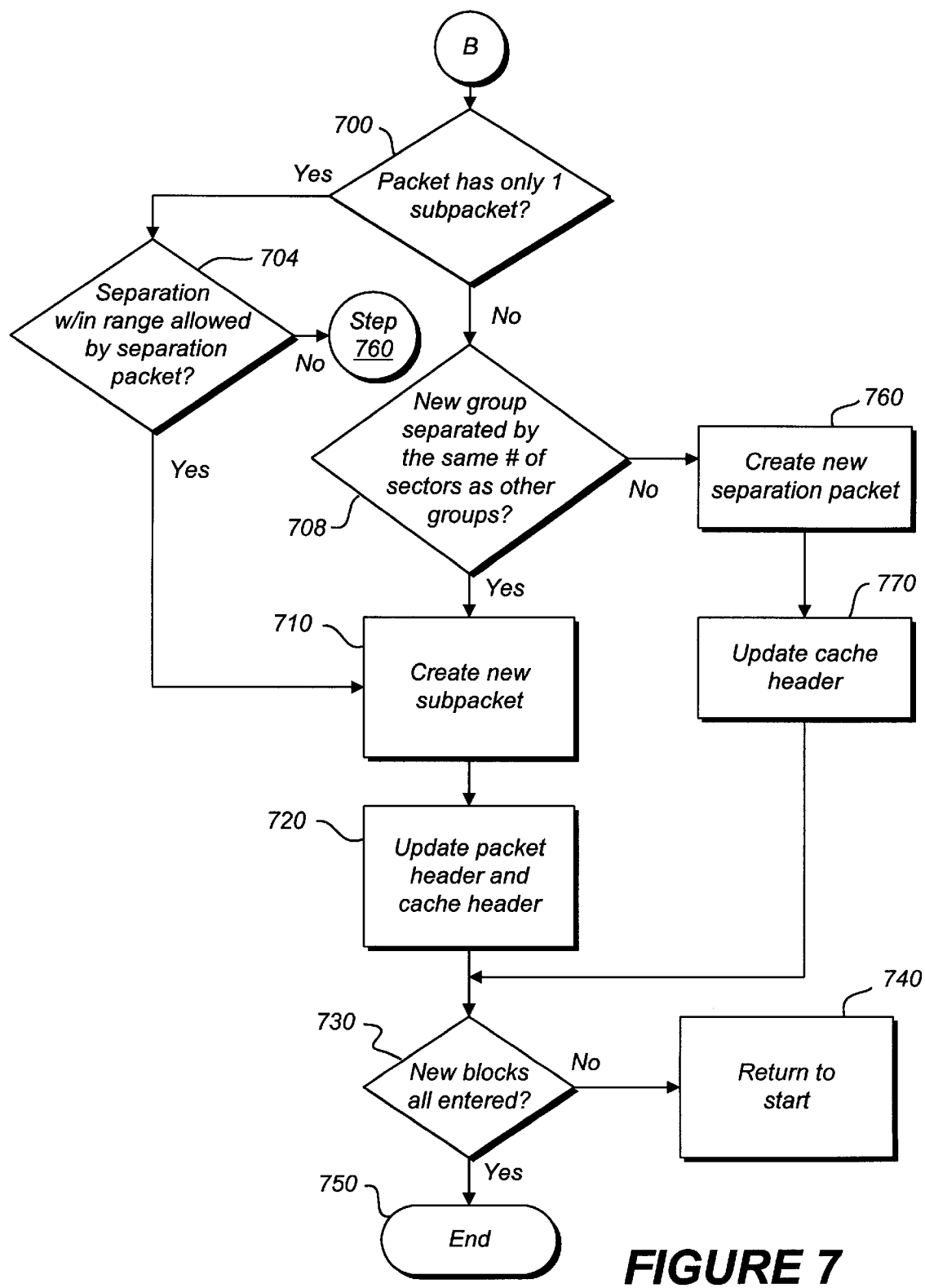
Figure 8:
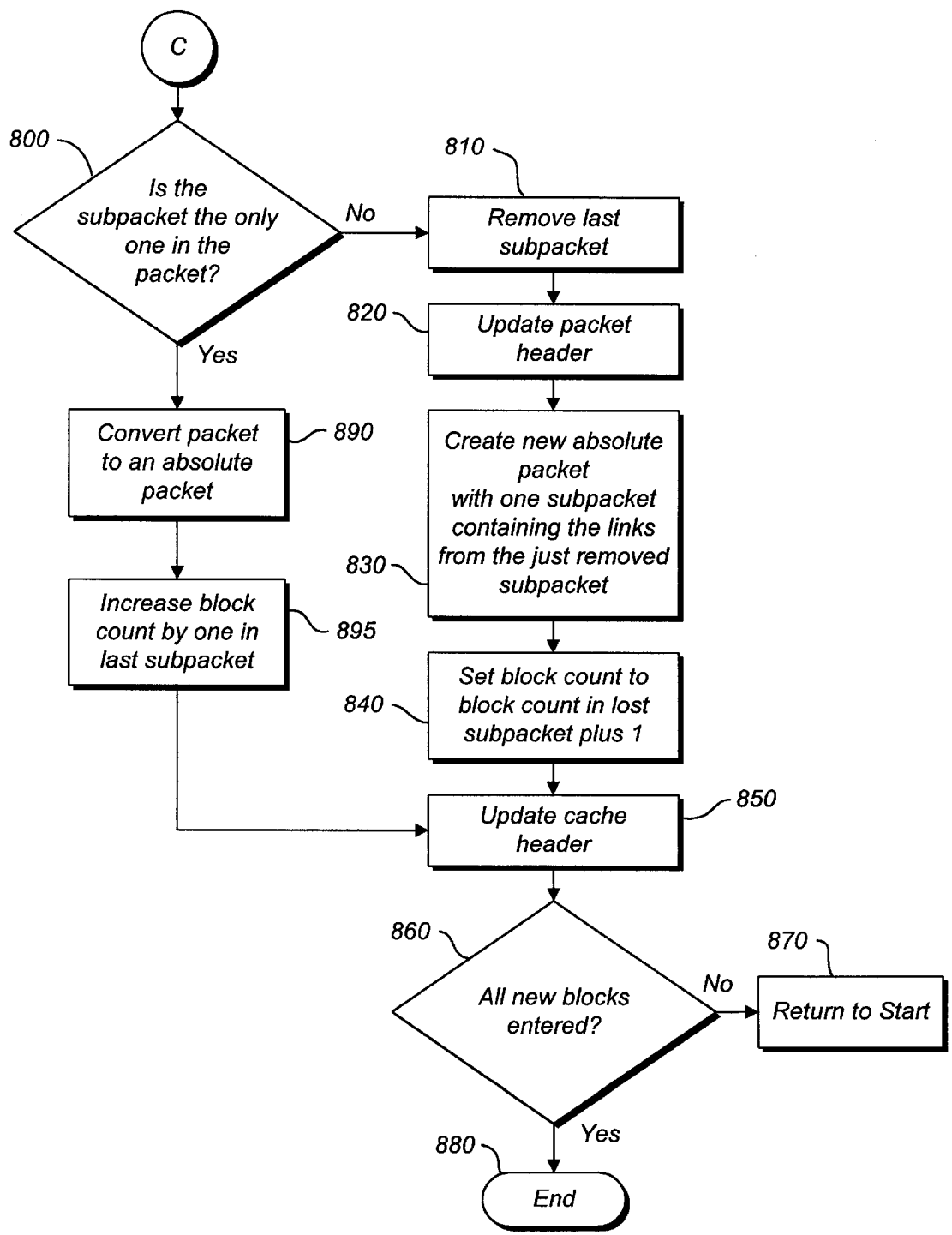
Figure 9:
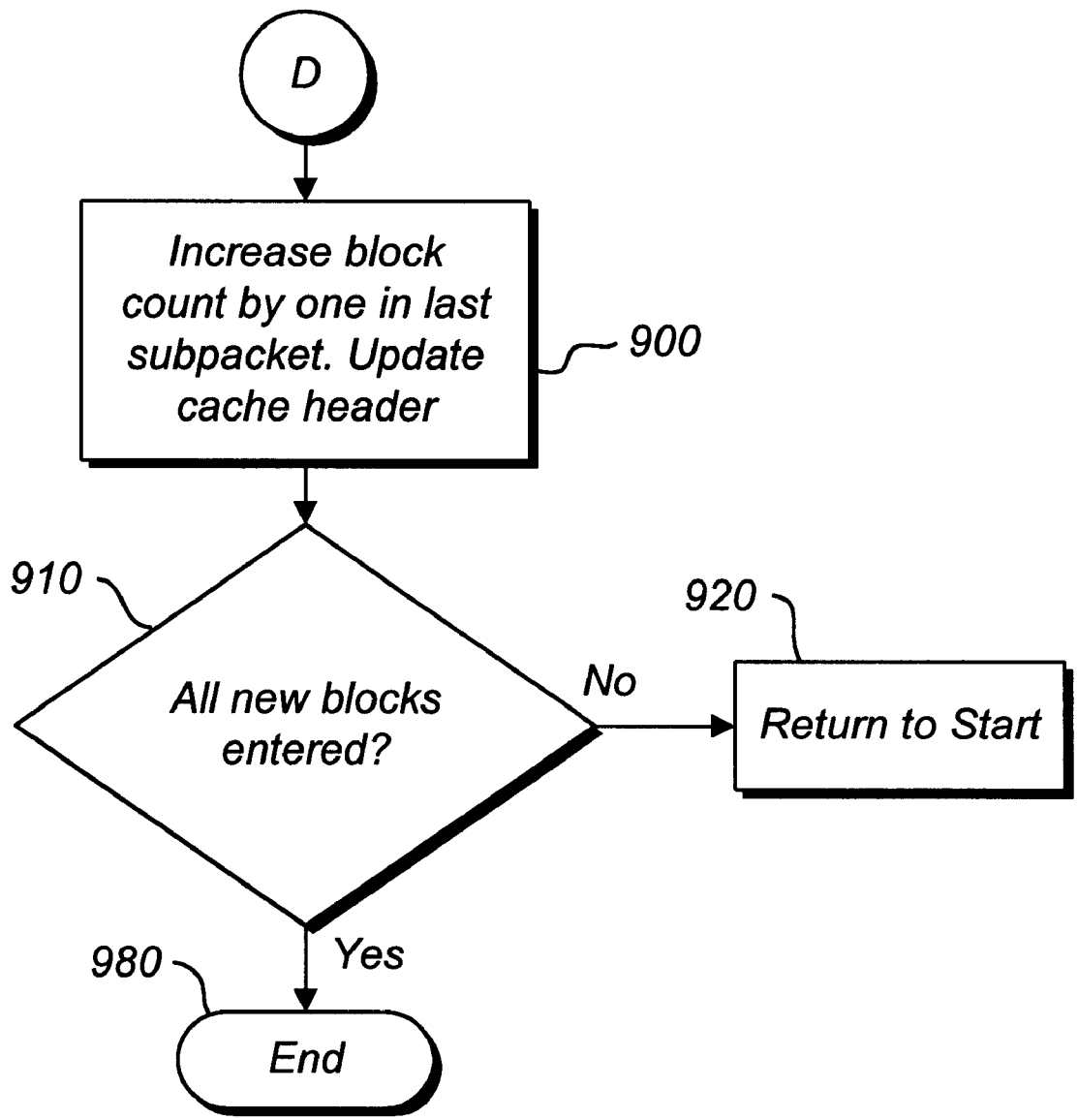
Figure 10:
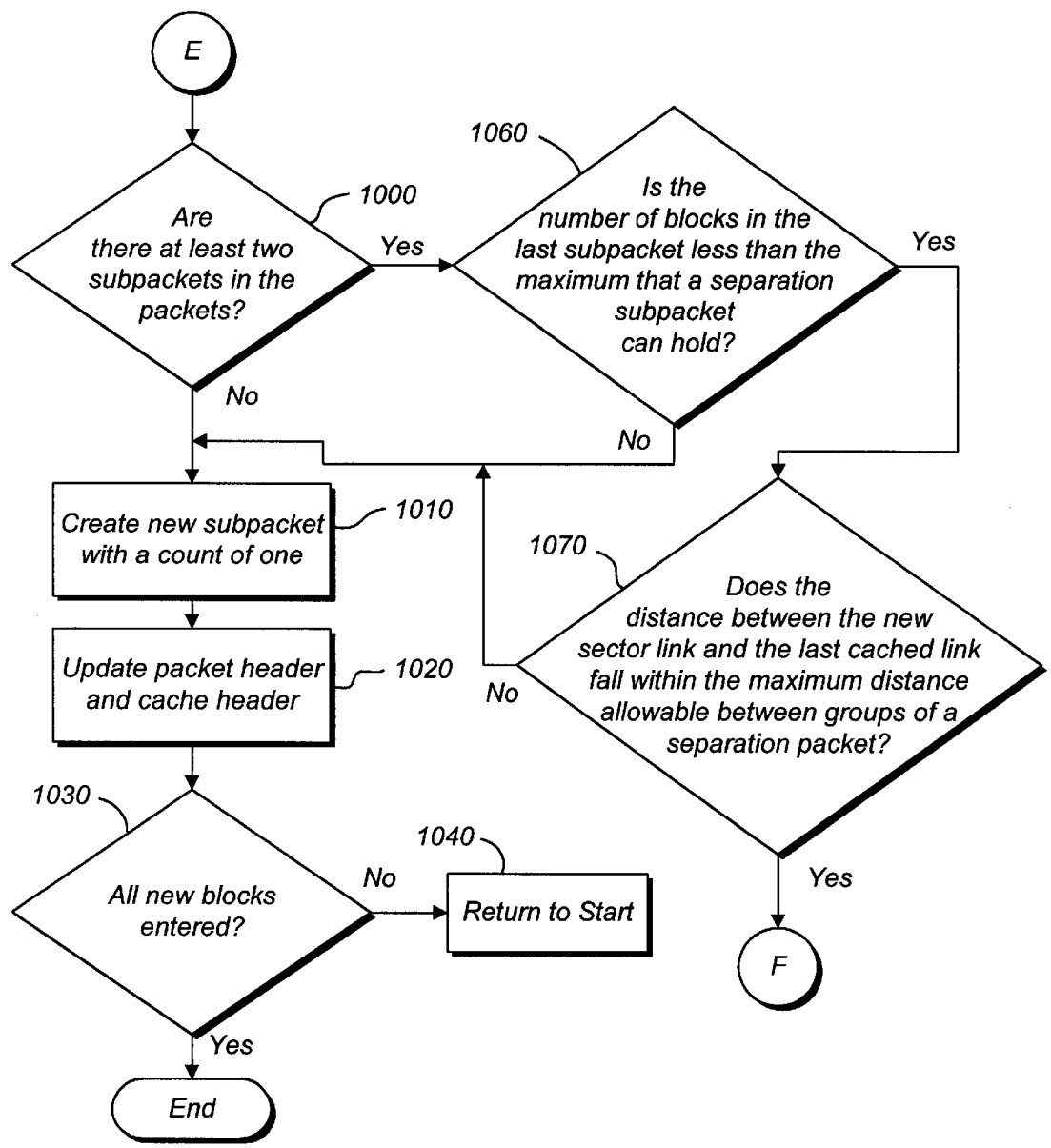
Figure 11:
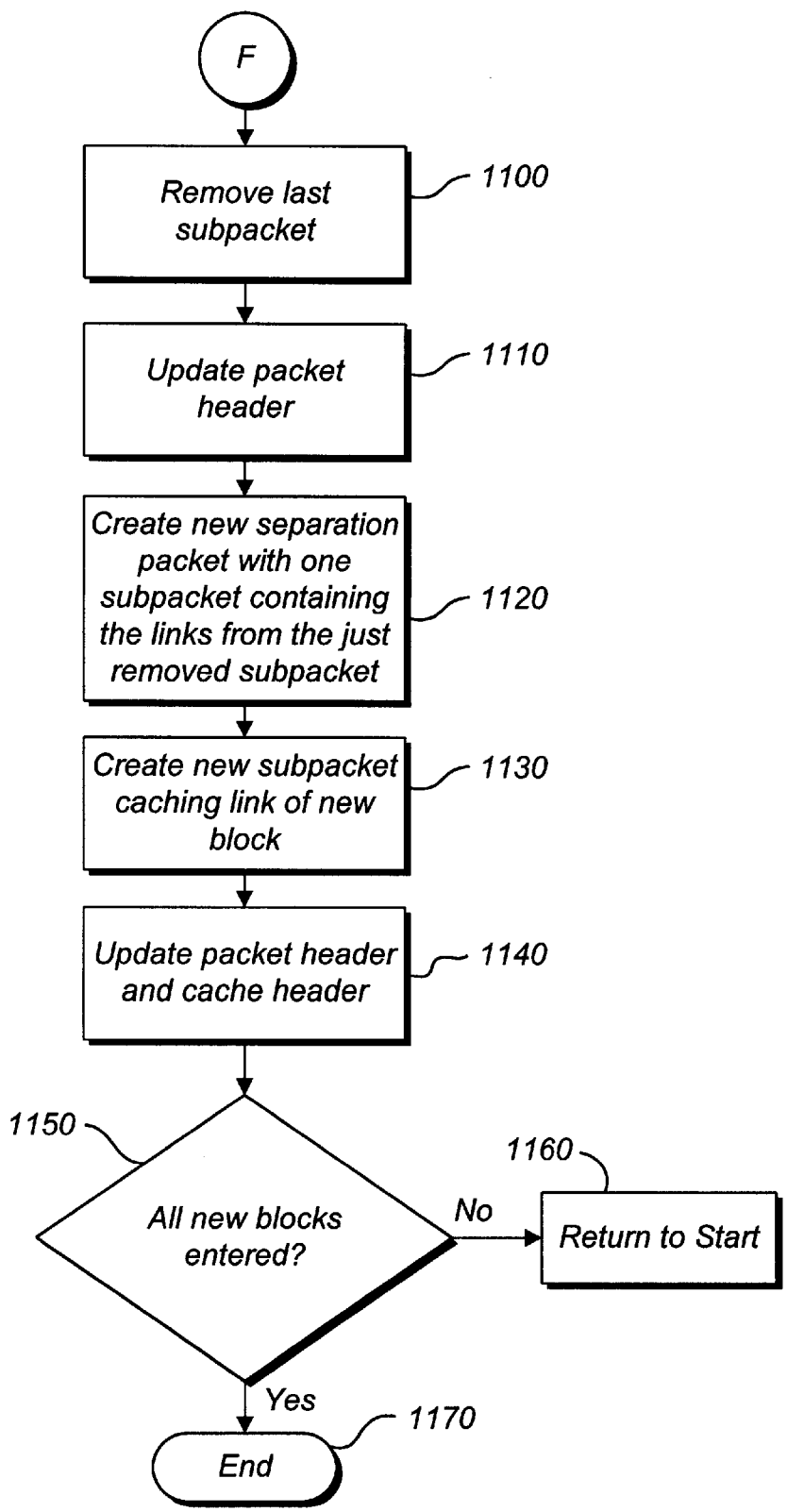

FIGS. 5–11 illustrates the method used by the cache interface 150 to write sector location information into a cache 140. First, the cache interface 150 looks 500 at the last packet in the cache 140 and determines 510 whether the last packet is a separation packet. Referring to FIG. 6, if the last packet is not a separation packet, the cache interface 150 determines 600 whether the new block (for which a sector location is being cached) is located in a higher numbered sector adjacent the last block represented in the subpacket. This determination is made because consecutive blocks stored on consecutive sectors are represented by the same subpacket when possible. If the new block is in a higher numbered, adjacent sector, the cache interface 150 ascertains 610 whether the subpacket has room to cache an additional sector location. The reason for this is that each subpacket may be limited to a certain amount of memory, such as a byte. In response to there being room in the subpacket, the block count of the subpacket is increased 620 by one, and the cache header is updated 620 to reflect the addition of one link to the cache. The cache interface 150 then determines 630 whether there are additional sector locations that need to be cached. If there are additional sector locations that need to be cached, then the cache interface starts 640 the entire caching process over. If there are no additional sector locations that need to be cached, then the caching process ends 650.

Returning to steps 600 and 610, in response to the new block not being in a higher numbered sector adjacent to the last block in the subpacket or in response to the subpacket not having room to cache an additional sector location, the cache interface 150 determines 1000 whether there are at least two subpackets in the packet. This determination is made because if there are at least two subpackets in the packet, then the last subpacket possibly may be removed and used to create a separation packet. If there are not two subpackets in the packet, a new subpacket is created 1010 with a block count of one, and the header of the packet having this new subpacket is updated 1020 to reflect that there are two subpackets in the packet. Additionally, the cache header is updated 1020 to reflect that an additional sector location has been cached.

After updating the packet and cache headers, the cache interface 150 then determines 1030 whether there are additional sector locations that need to be cached. If there are additional sector locations that need to be cached, then the cache interface starts 1040 the entire caching process over. If there are no additional sector locations that need to be cached, then the caching process ends 1050.

Returning to step 1000, in response to there being at least two subpackets in the packet, the cache interface 150 determines 1060 whether the number of blocks in the last subpacket is less than the maximum that a separation subpacket can hold. As discussed above, this determination is made because the field (in the subpacket) that stores the block count may be implemented as a fixed length field to conserve memory. In an alternate embodiment, the field is dynamically expandable, and, in this alternate embodiment, step 1060 is not needed. Returning to step 1060, the number of blocks is greater than the maximum that a separation packet can hold, the cache interface 150 proceeds to step 1010. If the number of blocks is less than the maximum, the cache interface 150 determines 1070 whether the distance between the new sector location and the last sector location fall within a maximum distance allowable between groups of a separation packet. Again, this determination is made because of the size of fields storing separation information may be fixed in separation packets. If there are no such size limitations, the determination in step 1070 is not made (all packets are separation packets in this case). In response to the distance being greater than the maximum, the cache interface 150 proceeds to step 1010. In response to the distance being less then the maximum, then the last subpacket of the current packet and a new subpacket representing the new block can form a separation packet. To do this, the cache interface 150 removes 1100 the last subpacket from the packet, and updates 1110 the packet header to indicate that the packet has one less subpacket. The cache interface 150 then creates 1120 a new separation packet with one subpacket having the sector location information stored in the removed subpacket. Additionally, a new subpacket is created 1130 to store the new sector location information. The packet header is 1140 updated to indicate the number of subpackets in the packet, the first sector location represented by the packet, and the number of sectors separating groups of consecutive blocks represented by the packet. The cache header is also updated 1140 to increase the number of sector locations cached by one and to indicate that this new separation packet is the last packet in the cache 140.

After updating the header, the cache interface 150 determines 1150 whether there are additional sector locations that need to be cached. If there are additional sector locations that need to be cached, then the cache interface starts 1160 the entire caching process over. If there are no additional sector locations that need to be cached, then the caching process ends 1170.

Returning to step 510 in FIG. 5, if the last packet in the cache is a separation packet, then the cache interface 150 looks 520 at the last subpacket and determines 530 whether the new block is in a higher numbered sector adjacent to the sector storing the last block represented in the subpacket. If the new block is not adjacent to the last block, then the cache interface 150 ascertains 700 whether the packet has more than one subpacket. If the packet has only one subpacket, the cache interface 150 determines 704 whether the separation between the location of the last block in the subpacket and the location of the new block is within the range allowed for a separation packet. In response to the separation being greater than that allowed for a separation packet, the cache interface proceeds to step 760 to create a new separation packet for the new block. In response to the separation being within the limits for a separation packet, the cache interface proceeds to step 710 to create a new subpacket for the new block.

Returning to step 700, if the packet has more than one subpacket, the cache interface 150 ascertains 708 whether the new block is separated from the last block by the same number of sectors as other groups represented in the packet are separated. This determination is made to figure out whether the new sector location information belongs in the current separation packet. If the new block is separated from the last block by the requisite number of sectors, then a new subpacket is created 710 to store the sector location information for the new block. The packet header is updated 720 to indicate that the number of subpackets in the packet has increased by one. The cache header is also updated 720 to increase the number of sector locations cached by one.

After updating the cache 140, the cache interface 150 then determines 730 whether there are additional sector locations that need to be cached. If there are additional sector locations that need to be cached, then the cache interface 150 starts 740 the entire caching process over. If there are no additional sector locations that need to be cached, then the caching process ends 750.

Returning to step 708, if the new block is not separated from the last block by the same number of sectors as other groups in the subpacket are separated from each other, then a new separation packet is created 760 to represent the new block. The cache interface 150 then updates 770 the cache header to reflect the new packet, and proceeds to step 730.

Returning to step 530 of FIG. 5, if the new block is in a higher numbered sector adjacent to the last block in the subpacket, then the cache interface 150 determines 540 whether the subpacket has room to cache another sector location. This determination is made because consecutive blocks stored in consecutive sectors are stored in the same subpacket when possible. In response to the subpacket not having such room, the cache interface 150 ascertains 800 whether the subpacket is the only subpacket in the packet. If the subpacket is not the only subpacket in the packet, then the subpacket is removed 810 from the packet, and the packet header is updated 820 to reflect this change. A new absolute packet is then created 830 with a subpacket having the sector location information in the removed subpacket. The block count of this subpacket is set 840 to the sum of the number of blocks in the just removed subpacket plus one to account for the new block, and the cache header is updated 850 to account for the new absolute packet.

The cache interface 150 then determines 860 whether there are additional sector locations that need to be cached. If there are additional sector locations that need to be cached, then the cache interface starts 870 the entire caching process over. If there are no additional sector locations that need to be cached, then the caching process ends 880.

Returning to step 800, if the subpacket is the only subpacket in the packet, the cache interface 150 converts 890 the packet to an absolute packet and increases 895 the subpacket block count by one. The packet is converted to an absolute packet because absolute subpackets do not have the restrictive memory constraints that separation subpackets have. The cache interface 150 updates 850 the cache header to account for the new sector location cached and proceeds to step 860.

Returning to step 540 in FIG. 5, in response to the subpacket having room to cache an additional sector location, the block count of the subpacket is increased 900 by one to account for the new block in the subpacket, and the cache header is updated 900 to reflect the fact that a new sector location has been cached. The cache interface 150 then determines 910 whether there are additional sector locations that need to be cached. If there are additional sector locations that need to be cached, then the cache interface 150 starts 920 the entire caching process over. If there are no additional sector locations that need to be cached, then the caching process ends 930.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

What is claimed is:

1. A method for determining where in a storage medium a select block of a data stream is located, wherein the method is used in a system including the data stream, the storage medium, a memory device coupled to the storage medium, and a linked list initially stored in the storage medium, wherein the data stream is divided into at least one block, wherein the linked list has a number of links equal to at least the number of blocks in the data stream, and wherein each link of the linked list indicates where in the storage medium a different block of the data stream is located, the method comprising:

determining whether the memory device is storing an indication of where in the storage medium the selected block is located;

in response to the indication being stored in the memory device, retrieving the indication from the memory device; and in response to the indication not being stored in the memory device, traversing select links of the linked list until the indication is found.

2. The method of claim 1, wherein an indication of information included in each link of the linked list that has been traversed is stored in the memory device.

3. The method of claim 2, wherein before the traversing step, the method further comprises the step of:

in response to the indication not being stored in the memory device, determining a last link of the linked list to have been traversed.

4. The method of claim 3, wherein, in response to the indication not being stored in the memory device, the linked list is traversed from a link after the last link traversed.

5. The method of claim 1, wherein the memory device is a cache having a header and the determining step comprises the step of determining whether the header indicates that the indication is cached.

6. A system for determining where a select block of a data stream is located, wherein the data stream is divided into at least one block, the system comprising:

a storage medium, the storage medium storing the data stream;

a linked list initially stored in the storage medium and having a number of links equal to at least the number of blocks in the data stream, each link of the link list indicating where in the storage medium a different block of the data stream is located;

an interface coupled to the storage medium, the interface configured to traverse at least one link of the link list at a select time to determine where in the storage medium the select block is located; and a memory device coupled to the storage medium and the interface, the memory device storing an indication of information included in each link of the link list that has been traversed, the interface configured to determine whether the memory device is storing an indication of where in the storage medium the select block is located, and, in response to the indication being stored in the memory device, to retrieve the indication from the memory device instead of traversing the link list for the indication.

7. The system of claim 6, wherein the interface is configured to determine a last link of the link list to have been traversed in response to the memory device not storing the indication.

8. The system of claim 7, wherein the interface is configured to traverse the linked list from a link after the last link traversed in response to the indication not being stored in the memory device.

9. A computer program embodied in a tangible medium and capable of being read by a computer for performing the method of claim 1.

10. A computer program embodied in a tangible medium and capable of being read by a computer for performing the method of claim 4.

11. The method of claim 4, further comprising storing an indication of information included in each traversed link in the memory device.

* * * * *